(12) United States Patent
Randez Perez et al.

(10) Patent No.: US 7,213,378 B2
(45) Date of Patent: May 8, 2007

(54) CONNECTION PART BETWEEN A PANEL AND A SUPPORT

(75) Inventors: Jesus Randez Perez, Barcelona (ES); Josep Ventallo Sabater, Barcelona (ES)

(73) Assignee: ITW Espana, S.A., Barcelona (ES)

( * ) Notice: Subject to any disclaimer, the term of this patent is extended or adjusted under 35 U.S.C. 154(b) by 159 days.

(21) Appl. No.: 11/037,021

(22) Filed: Jan. 19, 2005

(65) Prior Publication Data

US 2005/0214069 A1    Sep. 29, 2005

(30) Foreign Application Priority Data

Jan. 26, 2004  (ES)  ................ 200400152

(51) Int. Cl.
*B62D 27/04* (2006.01)
(52) U.S. Cl. ............... 52/704; 24/297; 296/146.7; 296/39.1
(58) Field of Classification Search ............ 296/146.7, 296/39.1; 24/297, 453, 458; 411/45–48; 52/704, 301; 403/408.1
See application file for complete search history.

(56) References Cited

U.S. PATENT DOCUMENTS

| 5,647,713 | A | | 7/1997 | Ge et al. |
| 5,651,634 | A | * | 7/1997 | Kraus ............... 403/408.1 |
| 6,336,768 | B1 | * | 1/2002 | Kraus ............... 403/408.1 |
| 6,431,585 | B1 | * | 8/2002 | Rickabus et al. ...... 280/728.3 |
| 6,813,865 | B2 | * | 11/2004 | Peterson ............. 52/506.05 |
| 6,984,096 | B2 | | 1/2006 | Kraus |

FOREIGN PATENT DOCUMENTS

| DE | 10358683 A1 | 7/2005 |
| EP | 0856668 A1 | 8/1998 |
| EP | 0921323 A2 | 6/1999 |
| EP | 0 937 898 | 8/1999 |
| EP | 0 939 234 | 9/1999 |
| EP | 0 964 170 | 12/1999 |
| EP | 1104852 A1 | 6/2001 |
| EP | 1128077 A1 | 8/2001 |
| ES | 2 163 221 | 1/2002 |
| JP | 08061336 A | 3/1996 |
| JP | 08082310 A | 3/1996 |
| JP | 10311312 A | 11/1998 |
| JP | 11344015 A | 12/1999 |

OTHER PUBLICATIONS

Search Report for the corresponding Spanish Patent Application received on Feb. 1, 2006.
Search Report for the corresponding Spanish Patent Application received on Nov. 8, 2006.

* cited by examiner

*Primary Examiner*—Dennis H Pedder
*Assistant Examiner*—Melissa A Black
(74) *Attorney, Agent, or Firm*—Lowe Hauptman & Berner, LLP

(57) ABSTRACT

A connection part between a panel and a support includes a body provided with an elongated segment that extends through an orifice made in the support. It incorporates an over-injected part made of a soft and compressible material on the body. The over-injected part has an absorption ring that envelopes a segment of the body and is in contact with a neck of retainer joined to the panel, thereby absorbing the lateral compressions resulting from positional misalignments due to manufacturing errors and expansions of the support and the panel.

20 Claims, 4 Drawing Sheets

CONNECTION PART BETWEEN A PANEL AND A SUPPORT

RELATED APPLICATIONS

The present application is based on, and claims priority from, Spanish Application Number 200400152, filed Jan. 26, 2004, the disclosure of which is hereby incorporated by reference herein in its entirety.

TECHNICAL FIELD

The disclosure mainly applies to the automotive field and relates to a connection part used to attach any panel, such as a vehicle door panel, to a support, such as a sector of a vehicle body.

BACKGROUND

The connection parts normally used to join a panel to the vehicle body are located on the vehicle body ready to receive a carriage or retainer element of the panel that is inserted by sliding until the retainer is coupled with the connection parts.

The different temperatures to which the panel and the vehicle body are subjected and their various materials result in expansions of these elements that deteriorate the attachment of the panel and the body, even damaging the panel. This situation can also be worsened by the fact that the initial adjustment between parts has been forced because of the dimensional deviations of the coupled elements from their nominal dimensions.

In order to solve this drawback a number of developments are proposed such as those discussed in EP 0 939 234, which describes a connection between a support and a panel that comprises a connection part that locks in the vehicle body and a cartridge associated to the panel provided with a bushing in which the upper overhanging segment of the connection part is coupled. The bushing is centred and connected to the cartridge body by a number of elastically deformable spiral ribs, so that the positional misalignments that may exist between the upper part of the connection part and the retention ring within fabrication tolerances may be absorbed by the elastic deformation of the ribs. Similarly, the ribs will absorb the variations resulting from the expansion of the panel or the vehicle body.

Another possible solution considered in EP 0 937 898 discloses in that the connection part incorporates an upper crown with the aforementioned spiral elastic ribs, which will absorb the dimensional variations when coupled to the retainer element of the panel. This solution can also be seen in ES 2 163 221.

On the other hand, U.S. Pat. No. 6,336,768 discusses a connection unit between a vehicle body support and a panel. The panel is provided with a retainer associated in which a connection part is coupled. The connection part is previously attached to the body by anchoring elements on its lower elongated segment and is provided with a number of discs that enter by lateral sliding in corresponding recesses defined in the support. This connection part incorporates a circular elastic gasket that rests on the inner face of the vehicle body to prevent leaks through the orifice made in said body through which the elongated lower segment of the connection part passes.

The use of this elastic gasket is also considered in EP 0 964 170.

SUMMARY

The connection part between the panel and the support, such as a vehicle body, proposed by disclosed embodiments of this invention mainly stands out by incorporating a body provided with a positional absorption element being of a soft and compressible plastic ring that absorbs the relative positional variations that may arise between the panel and the body as a result of manufacturing errors and/or expansion of said elements.

The panel has a retainer provided with at least one recess for sliding insertion on the body of the connection part when assembling the support with the panel. The connection part is previously connected to the vehicle body (or support) by an elongated lower segment of the body that extends through an orifice in the vehicle body and is attached thereto by a corresponding retention element.

The body has, on top of the elongated lower segment, a disc-shaped base, an intermediate disc-shaped segment and an upper disc-shaped segment. The upper disc-shaped segment is receivable in the recess of the retainer, while a neck segment between the disc-shaped upper segment and intermediate disc-shaped segment defines the location of the absorption ring.

The retainer recess is limited on the bottom by a plate with a neck that locks, by sliding of the panel, on the absorption ring, thereby establishing a coupling between the retainer and the connection part when the retainer neck contacts the absorption ring.

The absorption ring is obtained from a single over-injection operation performed on the body of the connection part. This operation yields a single over-injected part consisting of an annular base provided with an inner radial extension that finishes at an end where a cylindrical stem rises vertically. The absorption ring extends internally from the stem.

The annular base is formed on the disc-shaped base described above and constitutes a sealing gasket that prevents leaks through the orifice made in the body to which the connection part is coupled.

The absorption ring therefore envelopes the neck segment of the body and absorbs the movements between the panel and the body, or in other words, absorbs the movements between the neck of the retainer which is joined to the panel and the neck segment of the body which is joined to the vehicle body. The absorption capacity of the ring in a radial sense will be approximately +/−3 mm for a ring and neck diameter of about 9–10 mm.

The ring therefore has a compression capability that allows absorbing the relative lateral displacement between the panel and the vehicle body to absorb the expansion or construction irregularities within specific tolerances.

The stem described above is housed in radial grooves made in the disc-shaped base and in the intermediate disc-shaped segment, and constitutes the point where the absorption ring and the annular base are over-injected.

BRIEF DESCRIPTION OF THE DRAWINGS

To complete the description being made and in order to aid a better understanding of the characteristics of disclosed embodiments of the invention, a set of drawings is accompanied forming an integral part of the description where, for purposes of illustration and in a non-limiting manner the following is shown.

DETAILED DESCRIPTION OF EMBODIMENTS

Figure 1:
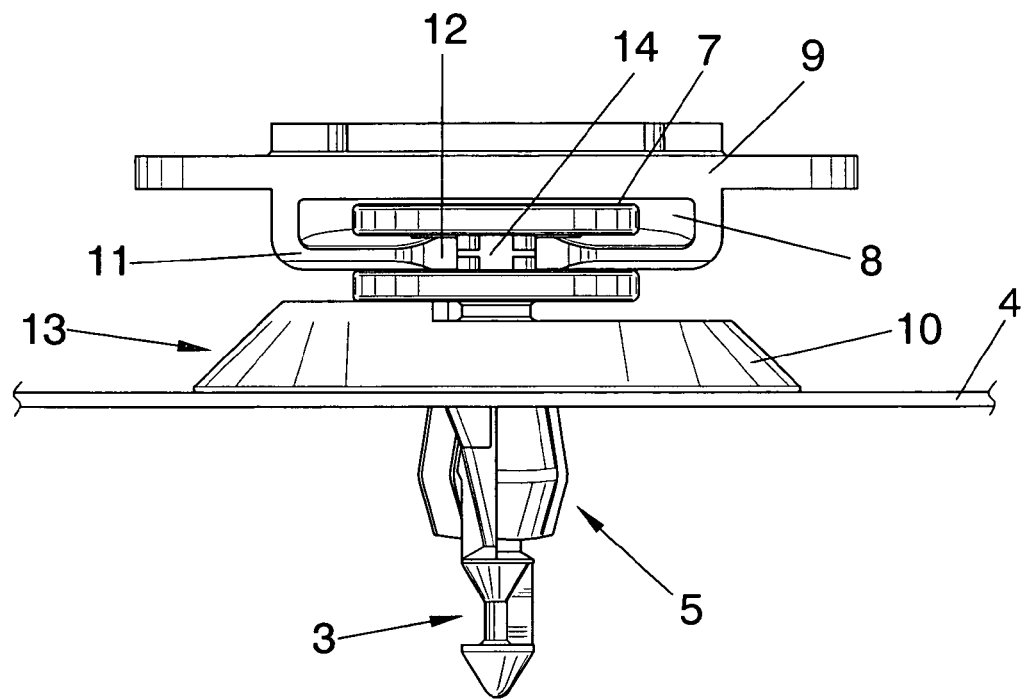
FIG. 1 is an elevational view of the connection part in accordance with an embodiment of this invention coupled to the vehicle body, on which the panel retainer is fitted.
Figure 2:
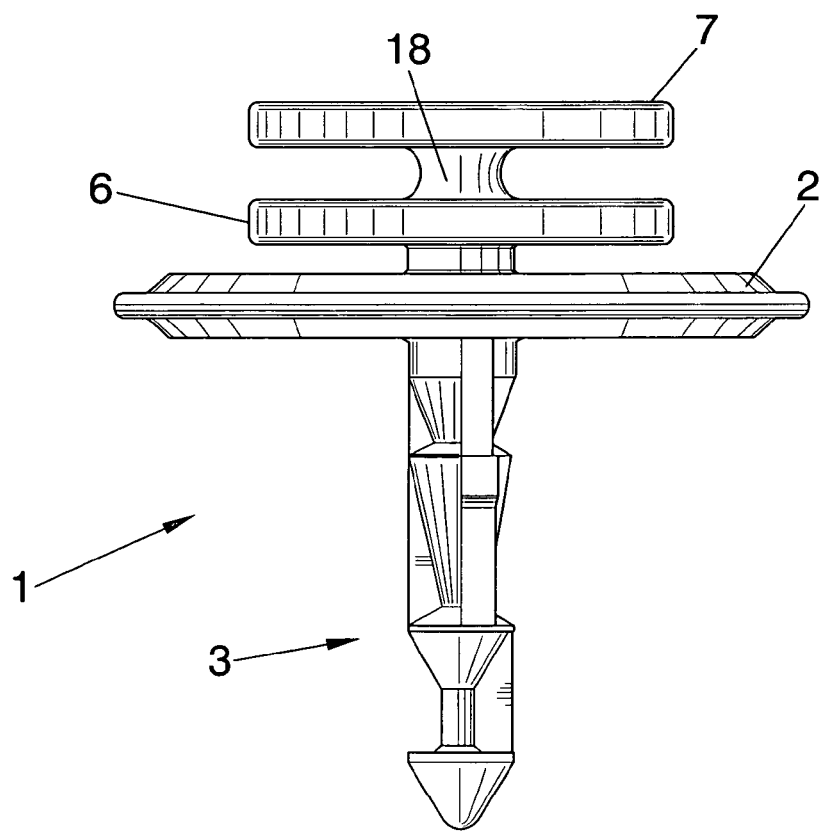
FIG. 2 is an elevational view of the body of the connection part.
Figure 3:
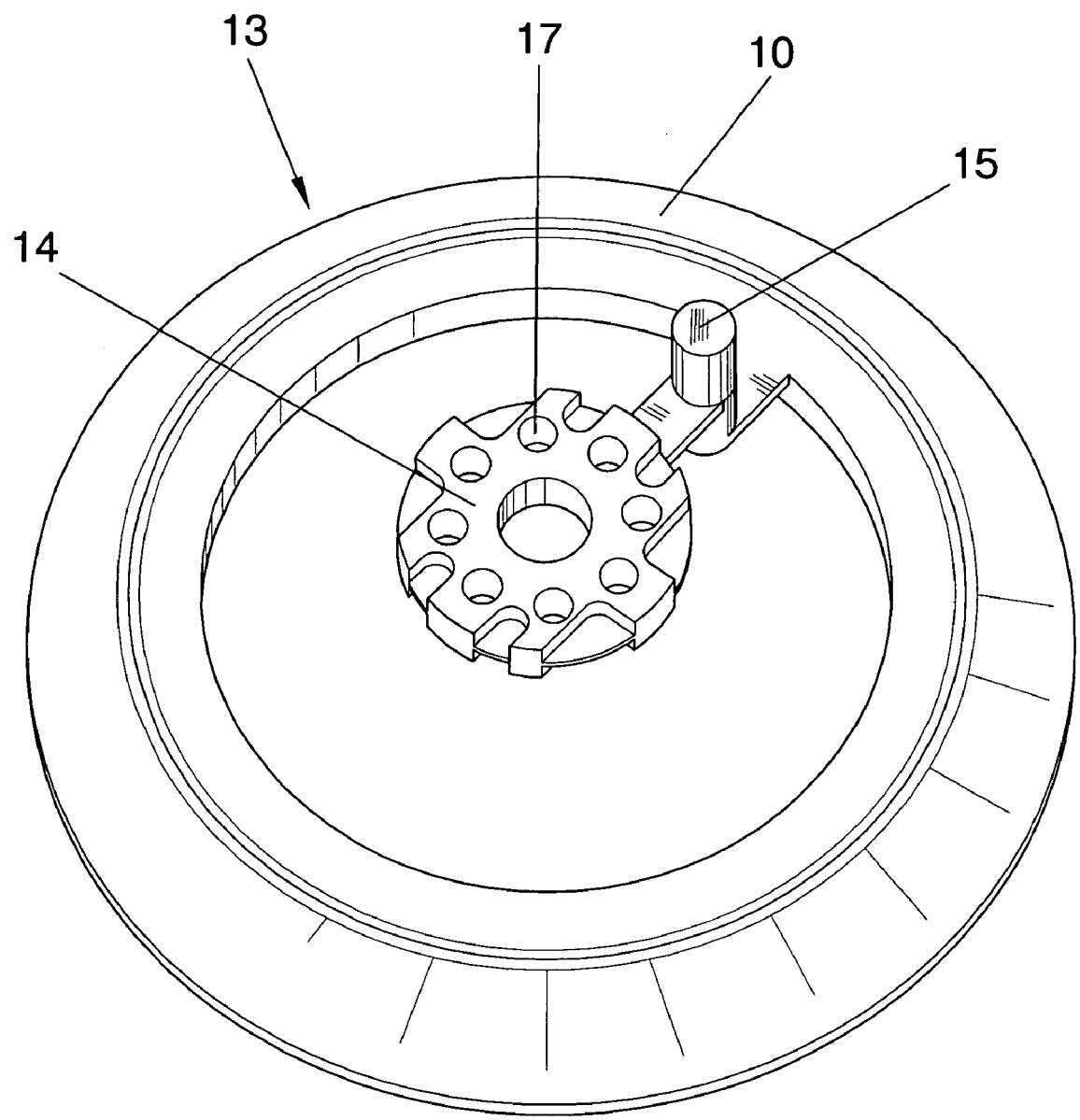
FIG. 3 is a perspective view of the part obtained by over-injection.
Figure 4:
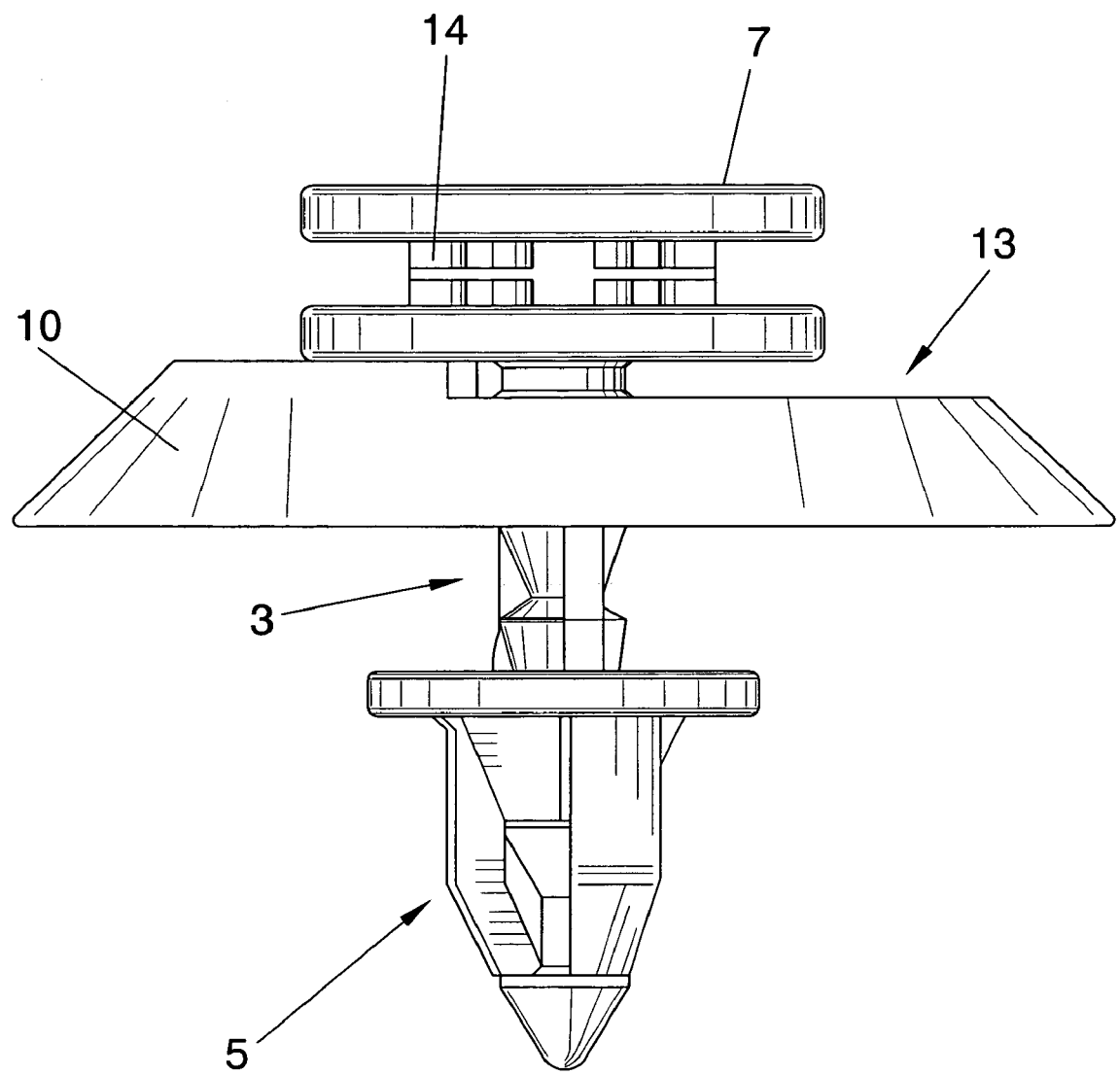
FIG. 4 is a cross-sectional elevation view of the connection part.
Figure 5:
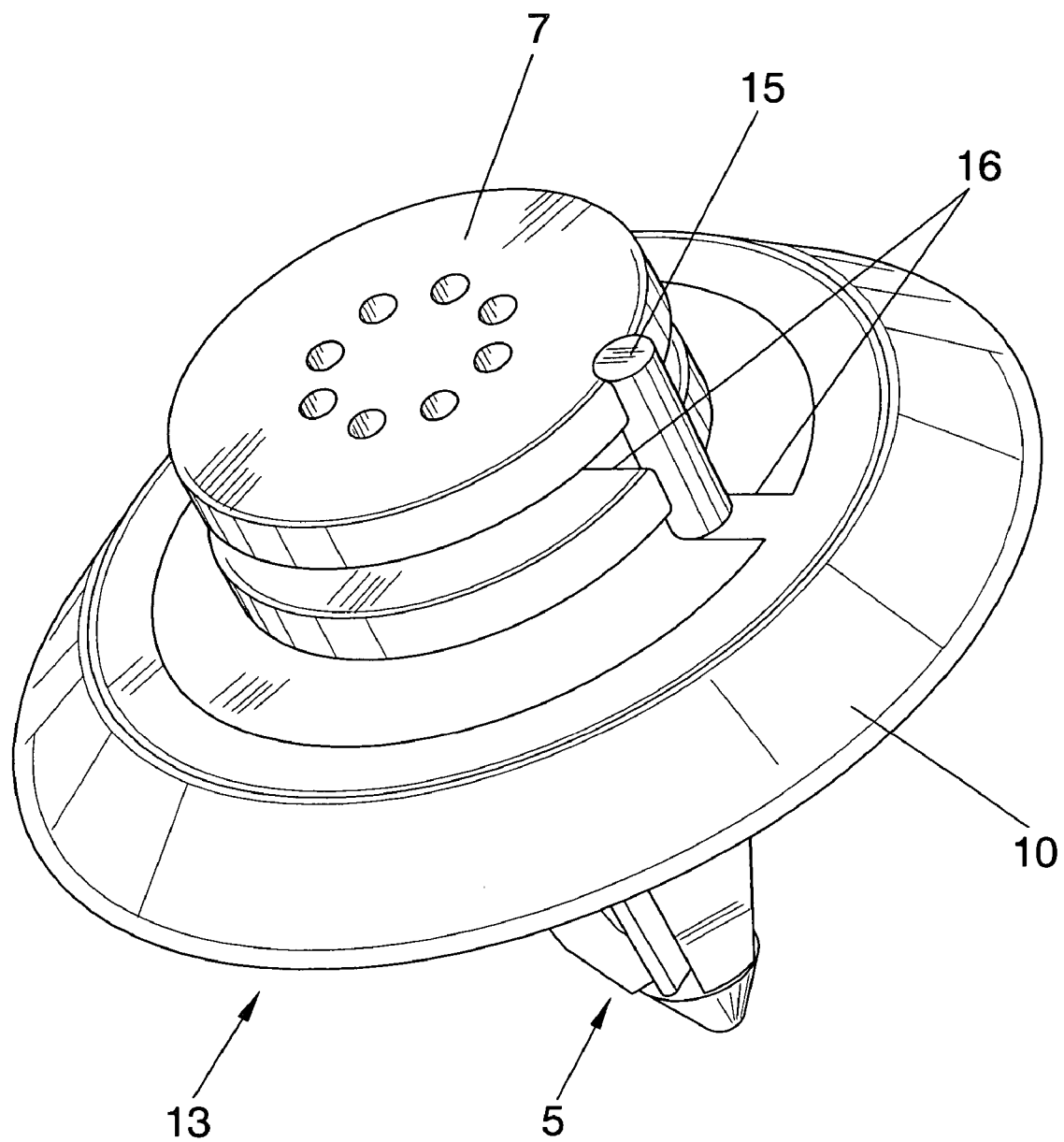
FIG. 5 is a perspective view of the connection part in which the over-injected part and the body can be seen.

The connection part in accordance with an embodiment of this invention is of the type comprising a body (1) formed by a disc-shaped base (2) from which an elongated segment (3) runs downward through an orifice made in the support (4), which may be a sector of a vehicle body, and is inserted in a retention bushing (5). The body (1) has on the top of the disc-shaped base (2) an intermediate disc-shaped segment (6) and an upper disc-shaped segment (7). A recess (8) of a retainer (9) joined to the panel (not shown) receives, in use, the upper disc-shaped segment (7). This recess (8) has on its bottom a plate (11) provided with a neck (12) for coupling with the body (1).

The connection part incorporates an over-injected part (13) made of a soft and compressible material on the body (1). The over-injected part (13) has an absorption ring (14) enveloping a neck segment (18) of the body (1). The segment (18) is located between the intermediate disc-shaped segment (6) and the upper disc-shaped segment (7). The absorption ring (14) is in contact with the neck (12) and absorbs the lateral compressions caused by positional misalignments due to manufacturing errors and expansions of the support (4) and the panel.

The over-injected part (13) comprises an annular base (10) that constitutes a sealing gasket provided with an inner radial extension that finishes at an end where a cylindrical stem (15) extends vertically upward. The absorption ring (14) extends internally of the radial extension from the stem (15).

The disc-shaped base (2) and the intermediate disc-shaped segment (6) are provided with radial grooves (16) in which the cylindrical stem (15) is housed to constitute the point from where the annular base (10) and the absorption ring (14) are over-injected.

The absorption ring (14) may include a number of orifices (17) distributed on its surface to facilitate its compression.

The disclosed connection part absorbs the dimensional deviations existing between the panel and the support within assembly tolerances. It also absorbs the slight positional variations produced in the assembly situation due to the unequal expansion of the parts due to the inner and outer vehicle temperatures and the different coefficient of expansion of the materials forming the panel and the support.

The invention claimed is:

1. A connection part for use between a panel and a support, said connection part comprising a body and an over-injected part, wherein
said body comprises:
a disc-shaped base,
an elongated segment which extends downward from the disc-shaped base and is adapted to be inserted through an orifice made in the support and then inserted in a retention bushing, and
on top of the disc-shaped base, an intermediate disc-shaped segment and an upper disc-shaped segment which define therebetween a neck segment;
said upper disc-shaped segment is receivable in a recess of a retainer joined to the panel;
said recess has a bottom defined by a plate provided with a neck for coupling with the neck segment of the body;
said over-injected part is made of a soft and compressible material on the body; and
said over-injected part comprises an absorption ring that envelopes the neck segment of the body, the absorption ring being adapted to be in contact with the neck of the recess of the retainer for absorbing any lateral compressions caused by positional misalignments due to manufacturing errors and/or expansions of the support and the panel.

2. The connection part according to claim 1, wherein the over-injected part further comprises an annular base and a cylindrical stem;
said annular base constitutes a sealing gasket provided with an inner radial extension which finishes at an end where the cylindrical stem rises vertically and inside which the absorption ring extends internally.

3. The connection part according to claim 1, wherein the disc-shaped base and the intermediate disc-shaped segment are provided with radial grooves in which a cylindrical stem is housed to constitute the point where the annular base and the absorption ring are over-injected.

4. The connection part according to claim 1, wherein the absorption ring is provided with a number of orifices distributed on a surface thereof to facilitate compression of said absorption ring.

5. The connection part according to claim 2, wherein the disc-shaped base and the intermediate disc-shaped segment are provided with radial grooves in which the cylindrical stem is housed to constitute the point where the annular base and the absorption ring are over-injected.

6. The connection part according to claim 2, wherein the absorption ring is provided with a number of orifices distributed on a surface thereof to facilitate compression of said absorption ring.

7. The connection part according to claim 3, wherein the absorption ring is provided with a number of orifices distributed on a surface thereof to facilitate compression of said absorption ring.

8. A connection, comprising a panel, a support and a connection part connecting said panel and said support, wherein
said connection part comprises a body and an over-injected part;
said body comprises:
a disc-shaped base,
an elongated segment which extends downward from the disc-shaped base and is inserted through an orifice made in the support and then inserted in a retention bushing, and
on top of the disc-shaped base, an intermediate disc-shaped segment and an upper disc-shaped segment which define therebetween a neck segment;
said upper disc-shaped segment is received in a recess of a retainer joined to the panel;
said recess has a bottom defined by a plate provided with a neck coupling with the neck segment of the body;
said over-injected part is made of a soft and compressible material on the body; and
said over-injected part comprises an absorption ring that envelopes the neck segment of the body, the absorption ring being in contact with the neck of the recess of the retainer for absorbing any lateral compressions caused by positional misalignments due to manufacturing errors and/or expansions of the support and the panel.

9. The connection according to claim 8, wherein the over-injected part further comprises an annular base and a cylindrical stem;

said annular base constitutes a sealing gasket provided with an inner radial extension which finishes at an end where the cylindrical stem rises vertically and inside which the absorption ring extends internally.

10. The connection according to claim 8, wherein the disc-shaped base and the intermediate disc-shaped segment are provided with radial grooves in which a cylindrical stem is housed to constitute the point where the annular base and the absorption ring are over-injected.

11. The connection according to claim 8, wherein the absorption ring is provided with a number of orifices distributed on a surface thereof to facilitate compression of said absorption ring.

12. The connection according to claim 9, wherein the disc-shaped base and the intermediate disc-shaped segment are provided with radial grooves in which the cylindrical stem is housed to constitute the point where the annular base and the absorption ring are over-injected.

13. The connection according to claim 9, wherein the absorption ring is provided with a number of orifices distributed on a surface thereof to facilitate compression of said absorption ring.

14. The connection according to claim 10, wherein the absorption ring is provided with a number of orifices distributed on a surface thereof to facilitate compression of said absorption ring.

15. A connection part for use between a panel and a support, said connection part comprising a body and an over-injected part, wherein said body comprises:
 a base,
 an elongated segment which extends downward from the base and is adapted to be inserted through an orifice made in the support and then secured to said support by a retention bushing, and
 on top of the base, an intermediate segment and an upper segment which define therebetween a neck segment;

said upper segment is receivable in a recess of a retainer joined to the panel;

said recess has a bottom defined by a plate provided with a neck for coupling with the neck segment of the body;

said over-injected part is made of a compressible material; and said over-injected part comprises an absorption ring that envelopes the neck segment of the body, the absorption ring being adapted to be in contact with the neck of the recess of the retainer for absorbing any lateral compressions caused by positional misalignments between the support and the panel.

16. The connection part according to claim 15, wherein the over-injected part further comprises an annular base positioned below said absorption ring and defining a sealing gasket; and a stem connecting the annular base with the absorption ring.

17. The connection part according to claim 16, wherein the over-injected part further comprises a first projection extending radially inwardly from an inner circumference of said annular base;

said stem extending upwardly from an inner end of said projection.

18. The connection part according to claim 17, wherein the over-injected part further comprises a second projection extending from a middle portion of said stem, radially inwardly of said annular base;

said absorption ring is connected to an inner and of said second projection.

19. The connection part according to claim 18, wherein the upper and intermediate segments of the body are provided with a radially extending grooves in which the stem is housed.

20. The connection part according to claim 15, wherein the absorption ring is provided with a number of orifices distributed on a surface thereof to facilitate radial compression of said absorption ring.

* * * * *